United States Patent
Sanders et al.

(10) Patent No.: US 8,057,566 B1
(45) Date of Patent: Nov. 15, 2011

(54) FIBERGLASS PRODUCT

(75) Inventors: Lewis Sanders, Fayetteville, AR (US); Christopher Erbe, Farmington, AR (US)

(73) Assignee: AAF-McQuay Inc., Louisville, KY (US)

( * ) Notice: Subject to any disclaimer, the term of this patent is extended or adjusted under 35 U.S.C. 154(b) by 42 days.

(21) Appl. No.: 12/634,325

(22) Filed: Dec. 9, 2009

Related U.S. Application Data

(60) Provisional application No. 61/233,116, filed on Aug. 11, 2009.

(51) Int. Cl.
*B01D 39/02* (2006.01)

(52) U.S. Cl. .............. 55/485; 55/486; 55/527; 428/222; 428/318.8; 428/325; 442/331

(58) Field of Classification Search ....... 210/483–510.1; 55/315–337, 361–382, 521–528; 428/44–52, 428/98–354; 442/172–180, 239–262, 266, 442/327–355, 366–368
See application file for complete search history.

(56) References Cited

U.S. PATENT DOCUMENTS

| | | | |
|---|---|---|---|
| 2,546,230 A * | 3/1951 | Modigliani ................. | 428/108 |
| 2,798,531 A | 7/1957 | Jackson, Jr. | |
| 2,984,286 A | 5/1961 | Copenhefer | |
| 3,051,602 A | 8/1962 | Schairbaum | |
| 3,072,513 A | 1/1963 | Schlarb | |
| 3,092,533 A | 6/1963 | Beckner | |
| 3,303,010 A | 2/1967 | Copenhefer | |
| 3,314,840 A | 4/1967 | Lloyd et al. | |
| 3,322,585 A | 5/1967 | Weber et al. | |
| 3,338,992 A | 8/1967 | Kinney | |
| 3,441,468 A | 4/1969 | Siggel et al. | |
| 3,459,627 A | 8/1969 | Vosburgh, Sr. | |
| 3,476,635 A | 11/1969 | Heh | |
| 3,506,420 A | 4/1970 | Jackson, Jr. et al. | |
| 3,526,557 A | 9/1970 | Taylor, Jr. | |
| 3,553,045 A | 1/1971 | Heh | |
| 3,689,342 A | 9/1972 | Vogt et al. | |
| 3,752,613 A | 8/1973 | Vogt et al. | |
| 3,833,438 A | 9/1974 | Kaneko et al. | |
| 4,212,915 A | 7/1980 | Vollbrecht et al. | |
| 4,220,496 A | 9/1980 | Carley et al. | |
| 4,628,571 A | 12/1986 | Marx et al. | |
| 5,639,411 A | 6/1997 | Wilkins et al. | |
| 5,908,596 A | 6/1999 | Wilkins et al. | |
| 6,663,805 B1 * | 12/2003 | Ekiner et al. ................. | 264/45.9 |
| 7,276,166 B2 * | 10/2007 | Koslow ......................... | 210/650 |
| 7,300,515 B2 * | 11/2007 | Porter .......................... | 106/770 |
| 2005/0026527 A1 * | 2/2005 | Schmidt et al. ............... | 442/381 |
| 2007/0049143 A1 * | 3/2007 | D'Silva et al. ................ | 442/59 |
| 2007/0072504 A1 * | 3/2007 | McCarthy ..................... | 442/327 |
| 2007/0173155 A1 * | 7/2007 | Shoemake et al. ........... | 442/164 |
| 2007/0202762 A1 * | 8/2007 | Hirawaki et al. ............. | 442/179 |

* cited by examiner

*Primary Examiner* — Duane Smith
*Assistant Examiner* — Thomas McKenzie
(74) *Attorney, Agent, or Firm* — Scott W. Higdon; John F. Salazar; Middleton Reutlinger

(57) ABSTRACT

In the description and drawings a final fiberglass product is disclosed. The final fiberglass product may have a fiber curl layer, a fiber skin layer, and a fiber loft layer between the fiber curl layer and the fiber skin layer. The fiber curl layer may be on an unfiltered air entry side of the final fiberglass product and have a plurality of generally sinusoidal fiber bundles therein.

19 Claims, 13 Drawing Sheets

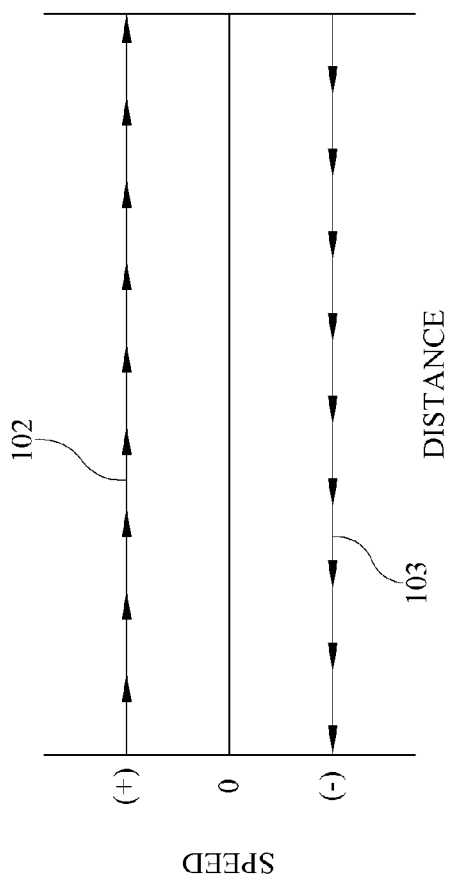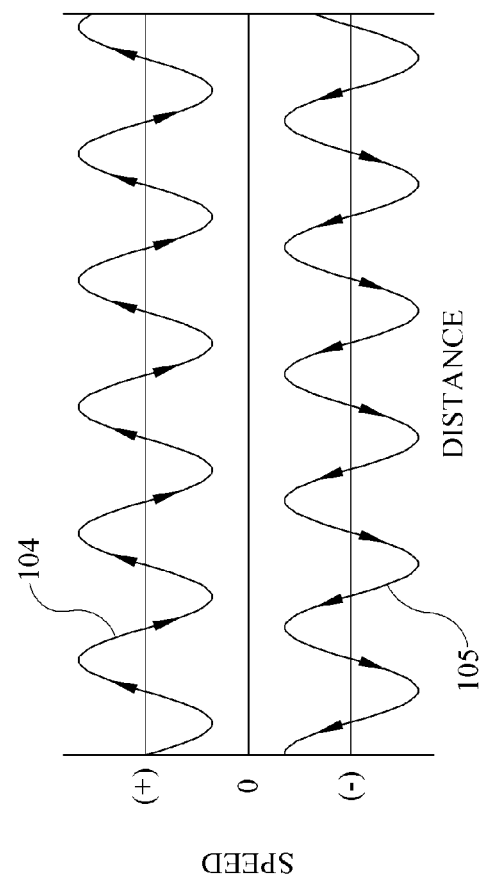

| Line 181 | | | Line 181 Continued | | | Line 182 | | | Line 182 Continued | | |
|---|---|---|---|---|---|---|---|---|---|---|---|
| Ref. | Inches from 1st Traverse Pt. | Fiber Angle | Ref. | Inches from 1st Traverse Pt. | Fiber Angle | Ref. | Inches from 1st Traverse Pt. | Fiber Angle | Ref. | Inches from 1st Traverse Pt. | Fiber Angle |
| 191 | 23.5306 | -0.645 | | 16.0694 | -0.645 | | 8.6583 | 0.000 | | 15.8583 | 0.154 |
| | 23.3111 | -0.645 | | 15.8500 | -0.645 | | 8.8583 | 0.004 | | 16.0583 | 0.154 |
| | 23.0917 | -0.645 | | 15.6306 | -0.645 | | 9.0583 | 0.007 | | 16.2583 | 0.154 |
| | 22.8722 | -0.645 | | 15.4111 | -0.645 | | 9.2583 | 0.012 | | 16.4583 | 0.153 |
| | 22.6528 | -0.645 | | 15.1917 | -0.645 | | 9.4583 | 0.016 | | 16.6583 | 0.151 |
| | 22.4333 | -0.645 | | 14.9722 | -0.645 | | 9.6583 | 0.021 | | 16.8583 | 0.150 |
| | 22.2139 | -0.645 | | 14.7528 | -0.645 | | 9.8583 | 0.026 | | 17.0583 | 0.147 |
| | 21.9944 | -0.645 | | 14.5333 | -0.645 | | 10.0583 | 0.031 | | 17.2583 | 0.145 |
| | 21.7750 | -0.645 | | 14.3139 | -0.645 | | 10.2583 | 0.036 | | 17.4583 | 0.142 |
| | 21.5556 | -0.645 | | 14.0944 | -0.645 | | 10.4583 | 0.042 | | 17.6583 | 0.139 |
| | 21.3361 | -0.645 | | 13.8750 | -0.645 | | 10.6583 | 0.047 | | 17.8583 | 0.135 |
| | 21.1167 | -0.645 | | 13.6556 | -0.645 | | 10.8583 | 0.053 | | 18.0583 | 0.131 |
| | 20.8972 | -0.645 | | 13.4361 | -0.645 | | 11.0583 | 0.059 | | 18.2583 | 0.127 |
| | 20.6778 | -0.645 | | 13.2167 | -0.645 | | 11.2583 | 0.065 | | 18.4583 | 0.123 |
| | 20.4583 | -0.645 | | 12.9972 | -0.645 | | 11.4583 | 0.071 | | 18.6583 | 0.118 |
| | 20.2389 | -0.645 | | 12.7778 | -0.645 | | 11.6583 | 0.077 | | 18.8583 | 0.113 |
| | 20.0194 | -0.645 | | 12.5583 | -0.645 | | 11.8583 | 0.083 | | 19.0583 | 0.108 |
| | 19.8000 | -0.645 | | 12.3389 | -0.645 | | 12.0583 | 0.088 | | 19.2583 | 0.103 |
| | 19.5806 | -0.645 | | 12.1194 | -0.645 | | 12.2583 | 0.094 | | 19.4583 | 0.097 |
| | 19.3611 | -0.645 | | 11.9000 | -0.645 | | 12.4583 | 0.100 | | 19.6583 | 0.091 |
| | 19.1417 | -0.645 | | 11.6806 | -0.645 | | 12.6583 | 0.105 | | 19.8583 | 0.086 |
| | 18.9222 | -0.645 | | 11.4611 | -0.645 | | 12.8583 | 0.110 | | 20.0583 | 0.080 |
| | 18.7028 | -0.645 | | 11.2417 | -0.645 | | 13.0583 | 0.116 | | 20.2583 | 0.074 |
| | 18.4833 | -0.645 | | 11.0222 | -0.645 | | 13.2583 | 0.120 | | 20.4583 | 0.068 |
| | 18.2639 | -0.645 | | 10.8028 | -0.645 | | 13.4583 | 0.125 | | 20.6583 | 0.062 |
| | 18.0444 | -0.645 | | 10.5833 | -0.645 | | 13.6583 | 0.129 | | 20.8583 | 0.056 |
| | 17.8250 | -0.645 | | 10.3639 | -0.645 | | 13.8583 | 0.133 | | 21.0583 | 0.050 |
| | 17.6056 | -0.645 | | 10.1444 | -0.645 | | 14.0583 | 0.137 | | 21.2583 | 0.045 |
| | 17.3861 | -0.645 | | 9.9250 | -0.645 | | 14.2583 | 0.140 | | 21.4583 | 0.039 |
| | 17.1667 | -0.645 | | 9.7056 | -0.645 | | 14.4583 | 0.144 | | 21.6583 | 0.034 |
| | 16.9472 | -0.645 | | 9.4861 | -0.645 | | 14.6583 | 0.146 | | 21.8583 | 0.028 |
| | 16.7278 | -0.645 | | 9.2667 | -0.645 | | 14.8583 | 0.149 | | 22.0583 | 0.023 |
| | 16.5083 | -0.645 | | 9.0472 | -0.645 | | 15.0583 | 0.150 | | 22.2583 | 0.018 |
| | 16.2889 | -0.645 | | 8.8278 | -0.645 | | 15.2583 | 0.152 | | 22.4583 | 0.014 |
| | | | 192 | 8.6083 | -0.645 | | 15.4583 | 0.153 | | 22.6583 | 0.009 |
| | | | | | | | 15.6583 | 0.154 | 193 | 22.8583 | 0.005 |
| | | | | | | | | | | 23.0583 | 0.002 |

FIG. 6A-1

| Line 183 | | | Line 183 Continued | | |
|---|---|---|---|---|---|
| Ref. | Inches from 1st Traverse Pt. | Fiber Angle | Ref. | Inches from 1st Traverse Pt. | Fiber Angle |
| | 22.9389 | -0.645 | | 15.4778 | -0.645 |
| | 22.7194 | -0.645 | | 15.2583 | -0.645 |
| | 22.5000 | -0.645 | | 15.0389 | -0.645 |
| | 22.2806 | -0.645 | | 14.8194 | -0.645 |
| | 22.0611 | -0.645 | | 14.6000 | -0.645 |
| | 21.8417 | -0.645 | | 14.3806 | -0.645 |
| | 21.6222 | -0.645 | | 14.1611 | -0.645 |
| | 21.4028 | -0.645 | | 13.9417 | -0.645 |
| | 21.1833 | -0.645 | | 13.7222 | -0.645 |
| | 20.9639 | -0.645 | | 13.5028 | -0.645 |
| | 20.7444 | -0.645 | | 13.2833 | -0.645 |
| | 20.5250 | -0.645 | | 13.0639 | -0.645 |
| | 20.3056 | -0.645 | | 12.8444 | -0.645 |
| | 20.0861 | -0.645 | | 12.6250 | -0.645 |
| | 19.8667 | -0.645 | | 12.4056 | -0.645 |
| | 19.6472 | -0.645 | | 12.1861 | -0.645 |
| | 19.4278 | -0.645 | | 11.9667 | -0.645 |
| | 19.2083 | -0.645 | | 11.7472 | -0.645 |
| | 18.9889 | -0.645 | | 11.5278 | -0.645 |
| | 18.7694 | -0.645 | | 11.3083 | -0.645 |
| | 18.5500 | -0.645 | | 11.0889 | -0.645 |
| | 18.3306 | -0.645 | | 10.8694 | -0.645 |
| | 18.1111 | -0.645 | | 10.6500 | -0.645 |
| | 17.8917 | -0.645 | | 10.4306 | -0.645 |
| | 17.6722 | -0.645 | | 10.2111 | -0.645 |
| | 17.4528 | -0.645 | | 9.9917 | -0.645 |
| | 17.2333 | -0.645 | | 9.7722 | -0.645 |
| | 17.0139 | -0.645 | | 9.5528 | -0.645 |
| | 16.7944 | -0.645 | | 9.3333 | -0.645 |
| | 16.5750 | -0.645 | | 9.1139 | -0.645 |
| | 16.3556 | -0.645 | | 8.8944 | -0.645 |
| | 16.1361 | -0.645 | | 8.6750 | -0.645 |
| | 15.9167 | -0.645 | | 8.4556 | -0.645 |
| | 15.6972 | -0.645 | | 8.2361 | -0.645 |
| | | | 194 | 8.0167 | -0.600 |
| | | | | | |
| | | | | | |

FIG. 6A-2

| | Line 184 | | | Line 184 Continued | | | Line 185 | | | Line 185 Continued | |
|---|---|---|---|---|---|---|---|---|---|---|---|
| Ref. | Inches from 1st Traverse Pt. | Fiber Angle | Ref. | Inches from 1st Traverse Pt. | Fiber Angle | Ref. | Inches from 1st Traverse Pt. | Fiber Angle | Ref. | Inches from 1st Traverse Pt. | Fiber Angle |
| | 8.0667 | 0.0000 | | 15.2667 | 0.1542 | | 22.3472 | -0.6450 | | 14.8861 | -0.6450 |
| | 8.2667 | 0.0035 | | 15.4667 | 0.1541 | | 22.1278 | -0.6450 | | 14.6667 | -0.6450 |
| | 8.4667 | 0.0074 | | 15.6667 | 0.1535 | | 21.9083 | -0.6450 | | 14.4472 | -0.6450 |
| | 8.6667 | 0.0116 | | 15.8667 | 0.1526 | | 21.6889 | -0.6450 | | 14.2278 | -0.6450 |
| | 8.8667 | 0.0160 | | 16.0667 | 0.1513 | | 21.4694 | -0.6450 | | 14.0083 | -0.6450 |
| | 9.0667 | 0.0208 | | 16.2667 | 0.1496 | | 21.2500 | -0.6450 | | 13.7889 | -0.6450 |
| | 9.2667 | 0.0257 | | 16.4667 | 0.1474 | | 21.0306 | -0.6450 | | 13.5694 | -0.6450 |
| | 9.4667 | 0.0309 | | 16.6667 | 0.1449 | | 20.8111 | -0.6450 | | 13.3500 | -0.6450 |
| | 9.6667 | 0.0363 | | 16.8667 | 0.1421 | | 20.5917 | -0.6450 | | 13.1306 | -0.6450 |
| | 9.8667 | 0.0418 | | 17.0667 | 0.1388 | | 20.3722 | -0.6450 | | 12.9111 | -0.6450 |
| | 10.0667 | 0.0475 | | 17.2667 | 0.1353 | | 20.1528 | -0.6450 | | 12.6917 | -0.6450 |
| | 10.2667 | 0.0532 | | 17.4667 | 0.1314 | | 19.9333 | -0.6450 | | 12.4722 | -0.6450 |
| | 10.4667 | 0.0591 | | 17.6667 | 0.1272 | | 19.7139 | -0.6450 | | 12.2528 | -0.6450 |
| | 10.6667 | 0.0650 | | 17.8667 | 0.1227 | | 19.4944 | -0.6450 | | 12.0333 | -0.6450 |
| | 10.8667 | 0.0709 | | 18.0667 | 0.1180 | | 19.2750 | -0.6450 | | 11.8139 | -0.6450 |
| | 11.0667 | 0.0768 | | 18.2667 | 0.1131 | | 19.0556 | -0.6450 | | 11.5944 | -0.6450 |
| | 11.2667 | 0.0827 | | 18.4667 | 0.1079 | | 18.8361 | -0.6450 | | 11.3750 | -0.6450 |
| | 11.4667 | 0.0885 | | 18.6667 | 0.1025 | | 18.6167 | -0.6450 | | 11.1556 | -0.6450 |
| | 11.6667 | 0.0942 | | 18.8667 | 0.0970 | | 18.3972 | -0.6450 | | 10.9361 | -0.6450 |
| | 11.8667 | 0.0998 | | 19.0667 | 0.0913 | | 18.1778 | -0.6450 | | 10.7167 | -0.6450 |
| | 12.0667 | 0.1052 | | 19.2667 | 0.0856 | | 17.9583 | -0.6450 | | 10.4972 | -0.6450 |
| | 12.2667 | 0.1105 | | 19.4667 | 0.0797 | | 17.7389 | -0.6450 | | 10.2778 | -0.6450 |
| | 12.4667 | 0.1156 | | 19.6667 | 0.0738 | | 17.5194 | -0.6450 | | 10.0583 | -0.6450 |
| | 12.6667 | 0.1204 | | 19.8667 | 0.0679 | | 17.3000 | -0.6450 | | 9.8389 | -0.6450 |
| | 12.8667 | 0.1250 | | 20.0667 | 0.0620 | | 17.0806 | -0.6450 | | 9.6194 | -0.6450 |
| | 13.0667 | 0.1293 | | 20.2667 | 0.0561 | | 16.8611 | -0.6450 | | 9.4000 | -0.6450 |
| | 13.2667 | 0.1334 | | 20.4667 | 0.0503 | | 16.6417 | -0.6450 | | 9.1806 | -0.6450 |
| | 13.4667 | 0.1371 | | 20.6667 | 0.0446 | | 16.4222 | -0.6450 | | 8.9611 | -0.6450 |
| | 13.6667 | 0.1405 | | 20.8667 | 0.0390 | | 16.2028 | -0.6450 | | 8.7417 | -0.6450 |
| | 13.8667 | 0.1435 | | 21.0667 | 0.0336 | | 15.9833 | -0.6450 | | 8.5222 | -0.6450 |
| | 14.0667 | 0.1462 | | 21.2667 | 0.0283 | | 15.7639 | -0.6450 | | 8.3028 | -0.6450 |
| | 14.2667 | 0.1485 | | 21.4667 | 0.0232 | | 15.5444 | -0.6450 | | 8.0833 | -0.6450 |
| | 14.4667 | 0.1505 | | 21.6667 | 0.0184 | | 15.3250 | -0.6450 | | 7.8639 | -0.6450 |
| | 14.6667 | 0.1520 | | 21.8667 | 0.0138 | | 15.1056 | -0.6450 | | 7.6444 | -0.6450 |
| | 14.8667 | 0.1531 | | 22.0667 | 0.0095 | | | | 196 | 7.4250 | -0.7000 |
| | 15.0667 | 0.1538 | | 22.2667 | 0.0054 | | | | | | |
| | | | 195 | 22.4667 | 0.0017 | | | | | | |

FIG. 6B

| | Line 281 | | | Line 282 | | | Line 282 Continued | |
|---|---|---|---|---|---|---|---|---|
| Ref. | Inches from 1st Traverse Pt. | Fiber Angle | Ref. | Inches from 1st Traverse Pt. | Fiber Angle | Ref. | Inches from 1st Traverse Pt. | Fiber Angle |
| 291 | 16.0200 | -0.3267 | | 8.4265 | 0.0001 | | 11.9715 | 0.1104 |
| | 16.0000 | -0.3267 | | 8.5129 | 0.0015 | | 12.0579 | 0.1101 |
| | 15.0000 | -0.3267 | | 8.5994 | 0.0031 | | 12.1444 | 0.1096 |
| | 14.0000 | -0.3267 | | 8.6859 | 0.0050 | | 12.2309 | 0.1087 |
| | 13.0000 | -0.3267 | | 8.7723 | 0.0070 | | 12.3173 | 0.1076 |
| | 12.0000 | -0.3267 | | 8.8588 | 0.0094 | | 12.4038 | 0.1063 |
| | 11.0000 | -0.3267 | | 8.9452 | 0.0119 | | 12.4902 | 0.1047 |
| | 10.0000 | -0.3267 | | 9.0317 | 0.0146 | | 12.5767 | 0.1028 |
| | 9.0000 | -0.3267 | | 9.1182 | 0.0176 | | 12.6632 | 0.1008 |
| 292 | 8.3400 | -0.3267 | | 9.2046 | 0.0207 | | 12.7496 | 0.0984 |
| | | | | 9.2911 | 0.0240 | | 12.8361 | 0.0959 |
| | | | | 9.3776 | 0.0274 | | 12.9226 | 0.0932 |
| | | | | 9.4640 | 0.0309 | | 13.0090 | 0.0902 |
| | | | | 9.5505 | 0.0346 | | 13.0955 | 0.0871 |
| | | | | 9.6370 | 0.0383 | | 13.1820 | 0.0838 |
| | | | | 9.7234 | 0.0421 | | 13.2684 | 0.0804 |
| | | | | 9.8099 | 0.0460 | | 13.3549 | 0.0769 |
| | | | | 9.8963 | 0.0500 | | 13.4413 | 0.0732 |
| | | | | 9.9828 | 0.0539 | | 13.5278 | 0.0695 |
| | | | | 10.0693 | 0.0578 | | 13.6143 | 0.0656 |
| | | | | 10.1557 | 0.0618 | | 13.7007 | 0.0618 |
| | | | | 10.2422 | 0.0656 | | 13.7872 | 0.0578 |
| | | | | 10.3287 | 0.0695 | | 13.8737 | 0.0539 |
| | | | | 10.4151 | 0.0732 | | 13.9601 | 0.0500 |
| | | | | 10.5016 | 0.0769 | | 14.0466 | 0.0460 |
| | | | | 10.5880 | 0.0804 | | 14.1330 | 0.0421 |
| | | | | 10.6745 | 0.0838 | | 14.2195 | 0.0383 |
| | | | | 10.7610 | 0.0871 | | 14.3060 | 0.0346 |
| | | | | 10.8474 | 0.0902 | | 14.3924 | 0.0309 |
| | | | | 10.9339 | 0.0932 | | 14.4789 | 0.0274 |
| | | | | 11.0204 | 0.0959 | | 14.5654 | 0.0240 |
| | | | | 11.1068 | 0.0984 | | 14.6518 | 0.0207 |
| | | | | 11.1933 | 0.1008 | | 14.7383 | 0.0176 |
| | | | | 11.2798 | 0.1028 | | 14.8248 | 0.0146 |
| | | | | 11.3662 | 0.1047 | | 14.9112 | 0.0119 |
| | | | | 11.4527 | 0.1063 | | 14.9977 | 0.0094 |
| | | | | 11.5391 | 0.1076 | | 15.0841 | 0.0070 |
| | | | | 11.6256 | 0.1087 | | 15.1706 | 0.0050 |
| | | | | 11.7121 | 0.1096 | | 15.2571 | 0.0031 |
| | | | | 11.7985 | 0.1101 | | 15.3435 | 0.0015 |
| | | | | 11.8850 | 0.1104 | 293 | 15.4300 | 0.0001 |

FIG. 8A

| | Line 283 | | | Line 284 | | | Line 284 Continued | |
|---|---|---|---|---|---|---|---|---|
| Ref. | Inches from 1st Traverse Pt. | Fiber Angle | Ref. | Inches from 1st Traverse Pt. | Fiber Angle | Ref. | Inches from 1st Traverse Pt. | Fiber Angle |
| | 15.4300 | -0.3267 | | 7.9782 | 0.0001 | | 11.4537 | 0.1101 |
| | 15.0000 | -0.3267 | | 8.0673 | 0.0015 | | 11.5428 | 0.1104 |
| | 14.0000 | -0.3267 | | 8.1565 | 0.0031 | | 11.6319 | 0.1104 |
| | 13.0000 | -0.3267 | | 8.2456 | 0.0050 | | 11.7210 | 0.1101 |
| | 12.0000 | -0.3267 | | 8.3347 | 0.0070 | | 11.8101 | 0.1096 |
| | 11.0000 | -0.3267 | | 8.4238 | 0.0094 | | 11.8992 | 0.1087 |
| | 10.0000 | -0.3267 | | 8.5129 | 0.0119 | | 11.9884 | 0.1076 |
| | 9.0000 | -0.3267 | | 8.6020 | 0.0146 | | 12.0775 | 0.1063 |
| | 8.0000 | -0.3267 | | 8.6911 | 0.0176 | | 12.1666 | 0.1047 |
| 294 | 7.8000 | -0.3267 | | 8.7803 | 0.0207 | | 12.2557 | 0.1028 |
| | | | | 8.8694 | 0.0240 | | 12.3448 | 0.1008 |
| | | | | 8.9585 | 0.0274 | | 12.4339 | 0.0984 |
| | | | | 9.0476 | 0.0309 | | 12.5230 | 0.0959 |
| | | | | 9.1367 | 0.0346 | | 12.6122 | 0.0932 |
| | | | | 9.2258 | 0.0383 | | 12.7013 | 0.0902 |
| | | | | 9.3149 | 0.0421 | | 12.7904 | 0.0871 |
| | | | | 9.4041 | 0.0460 | | 12.8795 | 0.0838 |
| | | | | 9.4932 | 0.0500 | | 12.9686 | 0.0804 |
| | | | | 9.5823 | 0.0539 | | 13.0577 | 0.0769 |
| | | | | 9.6714 | 0.0578 | | 13.1468 | 0.0732 |
| | | | | 9.7605 | 0.0618 | | 13.2359 | 0.0695 |
| | | | | 9.8496 | 0.0656 | | 13.3251 | 0.0656 |
| | | | | 9.9387 | 0.0695 | | 13.4142 | 0.0618 |
| | | | | 10.0278 | 0.0732 | | 13.5033 | 0.0578 |
| | | | | 10.1170 | 0.0769 | | 13.5924 | 0.0539 |
| | | | | 10.2061 | 0.0804 | | 13.6815 | 0.0500 |
| | | | | 10.2952 | 0.0838 | | 13.7706 | 0.0460 |
| | | | | 10.3843 | 0.0871 | | 13.8597 | 0.0421 |
| | | | | 10.4734 | 0.0902 | | 13.9489 | 0.0383 |
| | | | | 10.5625 | 0.0932 | | 14.0380 | 0.0346 |
| | | | | 10.6516 | 0.0959 | | 14.1271 | 0.0309 |
| | | | | 10.7408 | 0.0984 | | 14.2162 | 0.0274 |
| | | | | 10.8299 | 0.1008 | | 14.3053 | 0.0240 |
| | | | | 10.9190 | 0.1028 | | 14.3944 | 0.0207 |
| | | | | 11.0081 | 0.1047 | | 14.4835 | 0.0176 |
| | | | | 11.0972 | 0.1063 | | 14.5727 | 0.0146 |
| | | | | 11.1863 | 0.1076 | | 14.6618 | 0.0119 |
| | | | | 11.2754 | 0.1087 | | 14.7509 | 0.0094 |
| | | | | 11.3646 | 0.1096 | 295 | 14.8400 | 0.0070 |

FIG. 8B

FIBERGLASS PRODUCT

CROSS-REFERENCE TO RELATED DOCUMENTS

This application claims the benefit of Provisional Application Ser. No. 61/233,116 filed Aug. 11, 2009, entitled Method of Forming a Fiberglass Mat, which is hereby incorporated by reference in its entirety.

TECHNICAL FIELD

This invention pertains to a fiberglass product, and more particularly, various inventive methods and apparatus described herein relate to a fiberglass product having at least one fiber curl layer therein.

BACKGROUND

Technology for making a condensed mat of glass fiber strands is known in the art. Such technology includes, for example, the Modigliani process. The Modigliani process is generally described in several patents issued to Modigliani, namely, U.S. Pat. Nos. 2,546,230; 2,609,320 and 2,964,439. Subsequent improvements and variations of the Modigliani process have been made and are known in the art—many of which are described in patents issued subsequent to the Modigliani patents. The aforementioned patents and improvements generally involve a melting furnace feeding molten glass to orifices which discharge fine glass fibers. The fine glass fibers are in turn wrapped circumferentially around a rotating drum. During the deposition of the fibers on the rotating drum, a thermosetting resin may be applied to the surface to hold the fibers at their overlapping junctions between layers.

The furnace and/or orifices may move longitudinally back and forth along the rotating drum while the drum remains longitudinally stationary during the assembly process. Alternatively, the furnace and orifices may remain stationary while the drum rotates and moves longitudinally back and forth with respect to the stationary furnace.

After a suitable thickness of fibers has been created, the condensed mat may be severed from the drum by, for example, a cut across the mat parallel with the axis of the drum. Thereafter, the condensed mat may be stretched or expanded longitudinally and or latitudinally as desired. The stretched may thereafter optionally be cut to a predetermined size if desired.

SUMMARY

Generally, in one aspect a final fiberglass product having at least one fiber curl layer comprises a fiber curl layer, a fiber skin layer, and a fiber loft layer. The fiber curl layer is on an unfiltered air entry side and has a plurality of fiber curl fibers. The fiber skin layer is on an air exit side opposite the air entry side and has a plurality of fiber skin fibers. The fiber loft layer is between the fiber curl layer and the skin layer and has a plurality of fiber loft fibers. The fiber curl layer has a plurality of generally sinusoidal fiber bundles. The fiber bundles have an average of three hundred to four hundred and fifty of the fiber curl fibers therein. The fiber bundles have an average fiber bundle diameter of between seven tenths of a millimeter and one millimeter with a fiber bundle diameter standard deviation of less than sixth tenths of a millimeter.

In some embodiments the fiber bundle diameter standard deviation is less than five tenths of a millimeter.

In some embodiments the fiber bundles have an average curl length of one and seven tenths inches to two and a half inches.

In some embodiments the fiber bundles have an average curl amplitude of nine tenths of an inch to one and three tenths of an inch.

In some embodiments the loft layer comprises a first loft layer and a second loft layer characteristically distinct from the first loft layer. The first loft layer may have a plurality of first loft layer fibers of the fiber loft fibers and the second loft layer may have a plurality of second loft layer fibers of the loft fibers. In some versions of these embodiments the first loft layer is immediately adjacent the fiber curl layer, the second loft layer is immediately adjacent the skin layer, and the first loft layer is less dense than the second loft layer. In some versions of these embodiments the first loft layer is less corrugated than the second loft layer. In some versions of these embodiments the fiber curl fibers and the first loft layer fibers share a first substantially common average diameter. In some versions of these embodiments the skin fibers and the second loft layer fibers share a second substantially common average diameter distinct from the first substantially common average diameter.

Generally, in another aspect a final fiberglass product having at least one fiber curl layer comprises a fiber skin layer, a fiber loft layer, and a fiber curl layer. The fiber curl layer is on an unfiltered air entry side and has a plurality of fiber curl fibers. The fiber skin layer is on an air exit side opposite the air entry side and has a plurality of fiber skin fibers. The fiber loft layer is between the fiber curl layer and the skin layer and has a plurality of fiber loft fibers. The fiber curl layer has a plurality of generally sinusoidal fiber bundles providing rigidity along with filtering capacity. The fiber bundles have an average bundle diameter of between seventy-five hundredths of a millimeter and ninety-five hundredths of a millimeter. The actual bundle diameter in at least sixty eight percent of the fiber bundles is within fifty-five hundredths of a millimeter of the average bundle diameter.

In some embodiments the fiber bundles have an average curl length of one and seven tenths inches to two and a half inches. In some versions of these embodiments the fiber bundles have an average curl amplitude of nine tenths of an inch to one and three tenths of an inch. In some versions of these embodiments the fiber bundles have an average curl length of one and nine tenths inches to two and three tenths inches. In some versions of these embodiments the actual number of the fiber curls in at least sixty eight percent of the fiber bundles is within fifty hundredths of a millimeter of the bundle average.

Generally, in another aspect a final fiberglass product having at least one fiber curl layer comprises a fiber skin layer, a fiber loft layer, and a fiber curl layer. The fiber curl layer is on an unfiltered air entry side and has a plurality of fiber curl fibers. The fiber skin layer is on an air exit side opposite the air entry side and has a plurality of fiber skin fibers. The fiber loft layer is between the fiber curl layer and the skin layer and has a plurality of fiber loft fibers. The fiber curl layer has a plurality of generally sinusoidal fiber bundles providing rigidity along with filtering capacity. The fiber bundles have a bundle average of three hundred to four hundred and fifty the fiber curl fibers therein. The fiber bundles have an average bundle diameter of between seventy-five hundredths of a millimeter and ninety-five hundredths of a millimeter. The actual bundle diameter in at least sixty eight percent of the fiber bundles is within fifty-five hundredths of a millimeter of the average bundle diameter. The fiber bundles have an average curl amplitude of nine tenths of an inch to one and three tenths of an inch. The actual curl amplitude in at least sixty eight percent of the fiber bundles is within four tenths of an inch of the bundle average.

BRIEF DESCRIPTION OF THE ILLUSTRATIONS

FIG. 3A is a graphical depiction of an embodiment of a method of forming a skin layer in a fiberglass mat;

FIG. 3B is a graphical depiction of an embodiment of a method of forming a loft layer in a fiberglass mat;

FIGS. 6A-1 and 6A-2 are tables having a plurality of values for three of the lines depicted in the graphical depiction of the second embodiment of a method of forming a fiber curl layer in a fiberglass mat of FIG. 5;

FIG. 6B is a table having a plurality of values for two of the lines depicted in the graphical depiction of the second embodiment of a method of forming a fiber curl layer in a fiberglass mat of FIG. 5;

FIGS. 8A and 8B are tables having a plurality of values for each of the lines depicted in the graphical depiction of the third embodiment of a method of forming a fiber curl layer in a fiberglass mat of FIG. 7.

DETAILED DESCRIPTION

Figure 1:
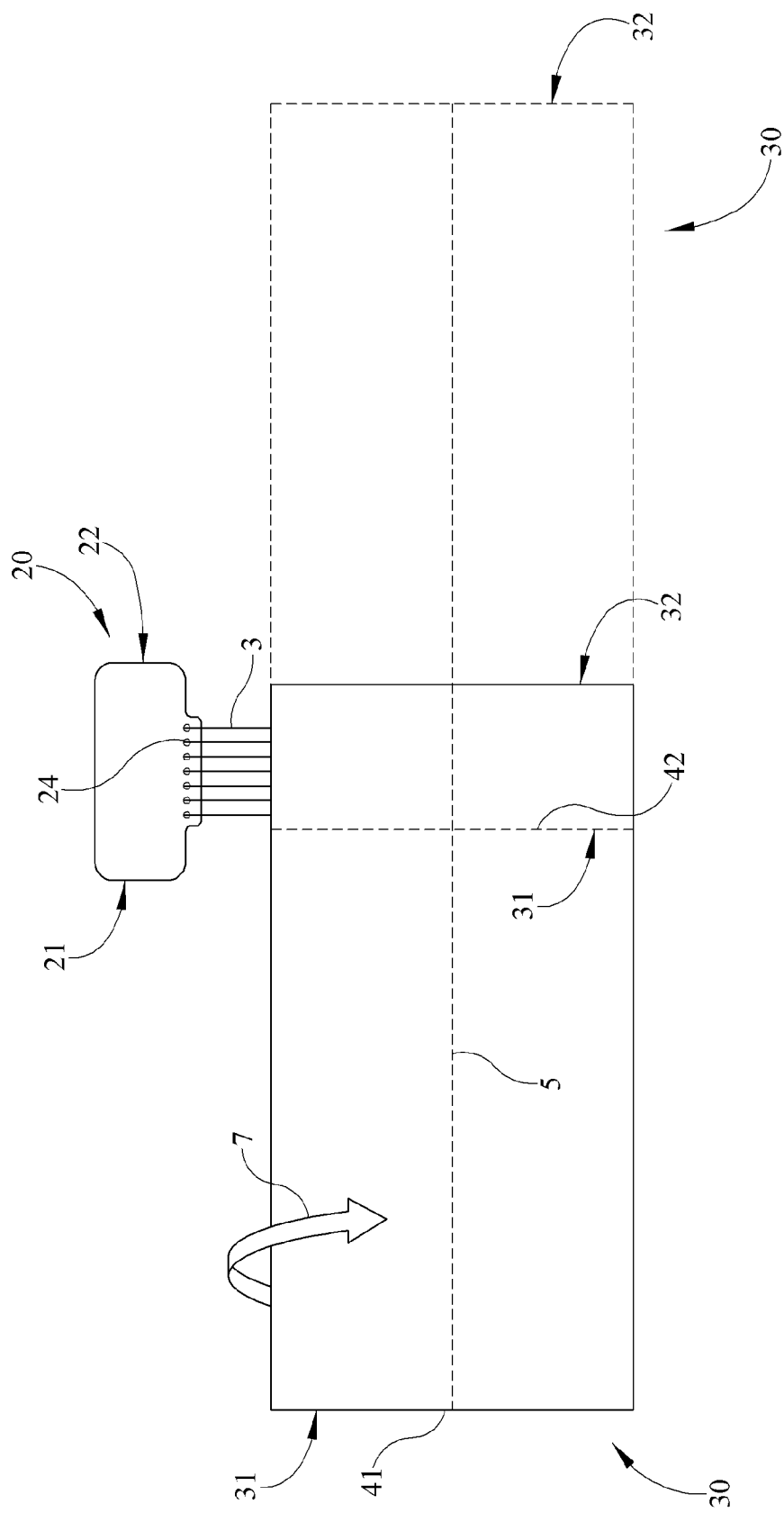
FIG. 1 is a front view of a stationary furnace and a traversable drum that may be utilized in embodiments of a method of manufacturing a fiberglass mat.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," "in communication with" and "mounted," and variations thereof herein are used broadly and encompass direct and indirect connections, couplings, and mountings. In addition, the terms "connected" and "coupled" and variations thereof are not restricted to physical or mechanical connections or couplings.

Furthermore, and as described in subsequent paragraphs, the specific mechanical configurations illustrated in the drawings are intended to exemplify embodiments of the invention and that other alternative mechanical configurations are possible.

Referring now to FIGS. 1 through 8A and B, wherein like numerals refer to like parts, embodiments of a method of manufacturing a fiberglass mat will be described in detail. Referring initially to FIG. 1, a furnace 20 and a drum 30 that may be utilized in the embodiments of the method described herein are shown. The furnace 20 may be mounted to a structure in a substantially stationary position. The furnace 20 has a furnace first end 21 and a furnace second end 22. The furnace 20 has a plurality of orifices 24 provided adjacent the drum 30 through which molten fiberglass material 3 may exit and be deposited onto the drum 30. The drum 30 has a drum first end 31 and a drum second end 32 and may be traversed along a traverse path generally indicated by a dotted line 5. The drum 30 may be traversed such that drum first end 31 thereof moves a preselected traverse length between a first drum traverse location 41 and a second drum traverse location 42. In FIG. 1 the drum 30 is depicted in solid lines with the first drum end 31 substantially aligned with the first drum traverse location 41. In FIG. 1 the drum 30 is also depicted in dotted lines with the first drum end 31 substantially aligned with the second drum traverse location 42. In some embodiments the drum 30 may be traversed along traverse path 5 by a sprocket and chain drive that may be driven by a variable speed motor controlled by a programmable logic control (PLC). The PLC may in some embodiments replace original eccentric and concentric sprockets in the sprocket and chain drive. In other embodiments the drum 30 may be traversed along traverse path 5 using other technology such as, for example, using a linear drive or using a motor in combination with timing belts. The drum 30 is also rotatable in a direction of rotation indicated generally by arrow 7. In the depicted embodiment the traverse path 5 is generally parallel with the axis of rotation of the drum 30.

Figure 2:
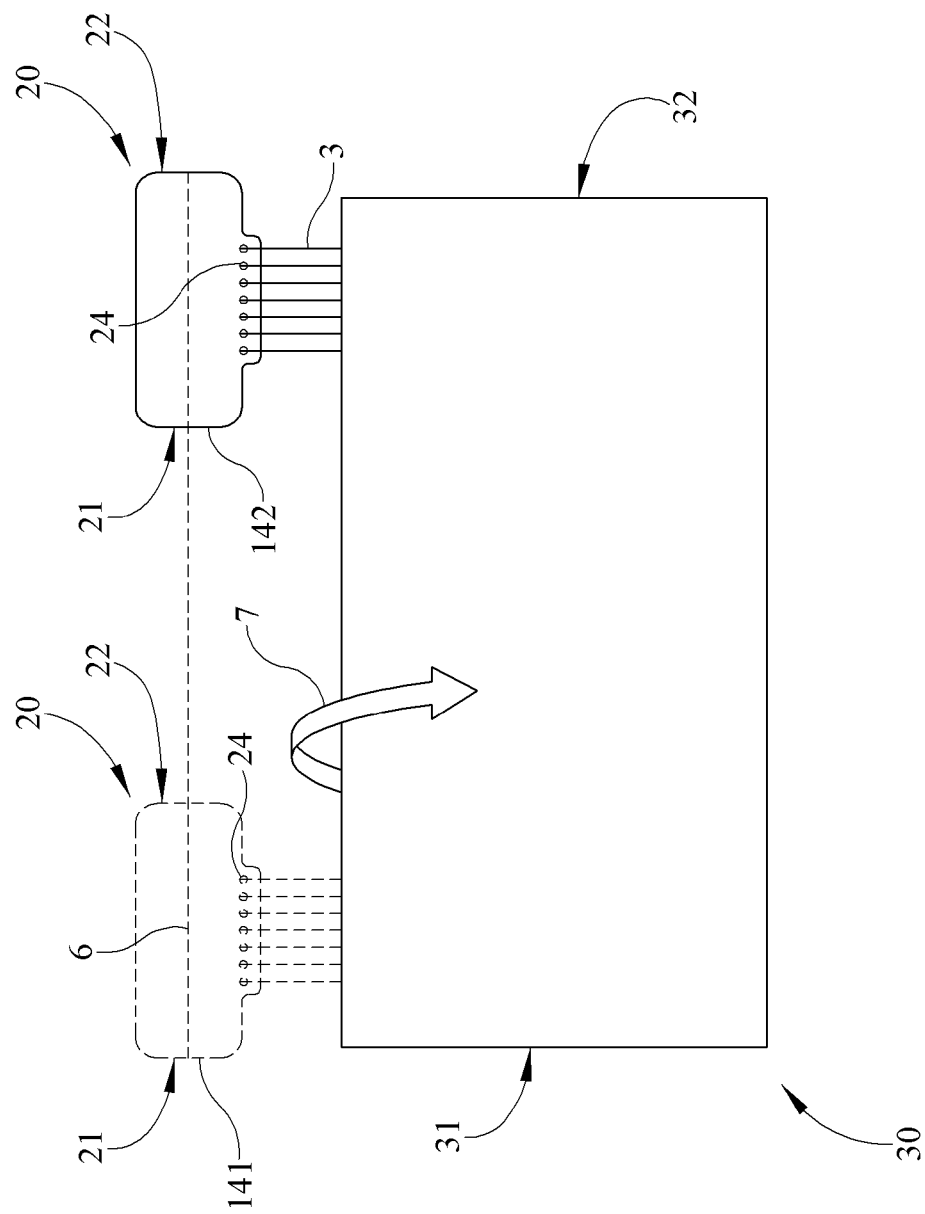
FIG. 2 is a front view of a traversable furnace and a stationary drum that may be utilized in embodiments of the method of manufacturing a fiberglass mat.

Alternatively, as depicted in FIG. 2, the drum 30 may be mounted to a structure in a substantially stationary position. The furnace 20 may be traversed such that the first furnace end thereof moves a preselected traverse length between a first furnace traverse location 141 and a second furnace traverse location 142. In FIG. 2 the furnace 20 is depicted in solid lines with the first furnace end 21 substantially aligned with the first furnace traverse location 141. In FIG. 2 the furnace 20 is also depicted in dotted lines with the first furnace end 22 substantially aligned with the second furnace traverse location 142. In some embodiments the furnace 20 may be traversed along a traverse path generally indicated by dotted line 6 by a sprocket and chain drive that may be driven by a variable speed motor controlled by a programmable logic control (PLC). The PLC may replace original eccentric and concentric sprockets in the sprocket and chain drive. In other embodiments the drum 30 may be traversed along traverse path 5 using other technology such as, for example, using a linear drive or using a motor in combination with timing belts. In the depicted embodiment the traverse path 6 is generally parallel with the axis of rotation of the drum 30.

The drum 30, the furnace 20, and interaction between the drum 30 and the furnace 20 are shown in FIGS. 1 and 2 are described herein in detail. One skilled in the art will realize that the embodiments of a method of manufacturing a fiberglass mat described herein may also be utilized with a drum, a furnace, and/or interactions between a drum and a furnace that may vary in one or more respects from those shown in FIGS. 1 and 2. For example, in some embodiments both the furnace and the drum may be traversable to build up a fiberglass may along a traverse length. Also, for example, in some embodiments the traverse length of the drum 30 and/or the furnace 20 may be altered such that less than or more of the drum 30 will be covered with a fiberglass mat. Throughout the remainder of this detailed description it will often be referenced that the first drum end 31 of drum 30 is being traversed between the first traverse location 41 and the second traverse location 42 and that the furnace 20 is remaining substantially stationary. Such description herein is for ease in description only and should not be regarded as limiting.

In FIGS. 3A and 3B, two traditional methods of forming a layer in a fiberglass mat are generally depicted in graphical form. In traditional methods of forming a layer in a fiberglass mat the drum 30 is traversed back and forth from the first traverse location 41 to the second traverse location 42 at either a constant (concentric) or a varying (eccentric) speed. The drum 30 is moving in a single direction only as drum first end 31 traverses from the first traverse location 41 to the second traverse location 42 and drum 30 moves in a single opposite direction as drum first end 31 traverses from the second traverse location 42 to the first traverse location 41. Typically, a single direction substantially constant speed is used to form skin or backing layers and a variable speed, such as, for example, a sinusoidally variable speed, is used to form lofting layers.

Referring particularly to FIG. 3A, a skin layer traverse as drum first end 31 moves from the first traverse location 41 to the second traverse location 42 and a skin layer traverse as drum first end 31 moves from the second traverse location 42 to the first traverse location 41 is graphically depicted. The left most horizontal location in the graph of FIG. 3A represents the positioning of the first traverse location 41. The right most horizontal location in the graph of FIG. 3A represents the positioning of the second traverse location 42. Skin line 102 tracks the drum first end 31 as the drum 30 moves at a constant speed, causing the drum first end 31 to move from the first traverse location 41 to the second traverse location 42. The drum 30 then stops (transitioning around a sprocket in some embodiments) as the drum first end 31 reaches the second traverse location 42 and the drum 30 moves in an opposite direction at substantially the same constant speed. This causes the drum first end 31 to move back in the opposite direction to the first traverse location 41, as represented by skin line 103. Multiple substantially constant speed traverses of the drum 30, wherein the drum first end 31 moves back and forth between the first traverse location 41 and the second traverse location 42 may occur while the drum 30 is rotating to achieve a skin layer.

Referring particularly to FIG. 3B, a body layer traverse as drum first end 31 moves from the first traverse location 41 to the second traverse location 42 and a body layer traverse as drum first end 31 moves from the second traverse location 42 to the first traverse location 41 is graphically depicted. The left most horizontal location in the graph of FIG. 3B represents the positioning of the first traverse location 41. The right most horizontal location in the graph of FIG. 3B represents the positioning of the second traverse location 42. Loft line 104 tracks drum first end 31 as the drum 30 moves at a sinusoidally variable speed, causing the drum first end 31 to move from the first traverse location 41 to the second traverse location 42. The drum 30 then stops (transitioning around a sprocket in some embodiments) and the drum 30 moves in an opposite direction at a sinusoidally variable speed, causing the drum first end to move from the second traverse location 42 back to the first traverse location 41, as represented by loft line 105. Multiple variable speed traverses of the drum 30, wherein the drum first end 31 moves back and forth between the first traverse location 41 and the second traverse location 42, may occur while the drum 30 is rotating to achieve a loft or body layer. In alternative embodiments of forming a body layer the centerline, the amplitude, phase and/or frequency of loft line 104 and/or loft line 105 may be adjusted.

Figure 4:
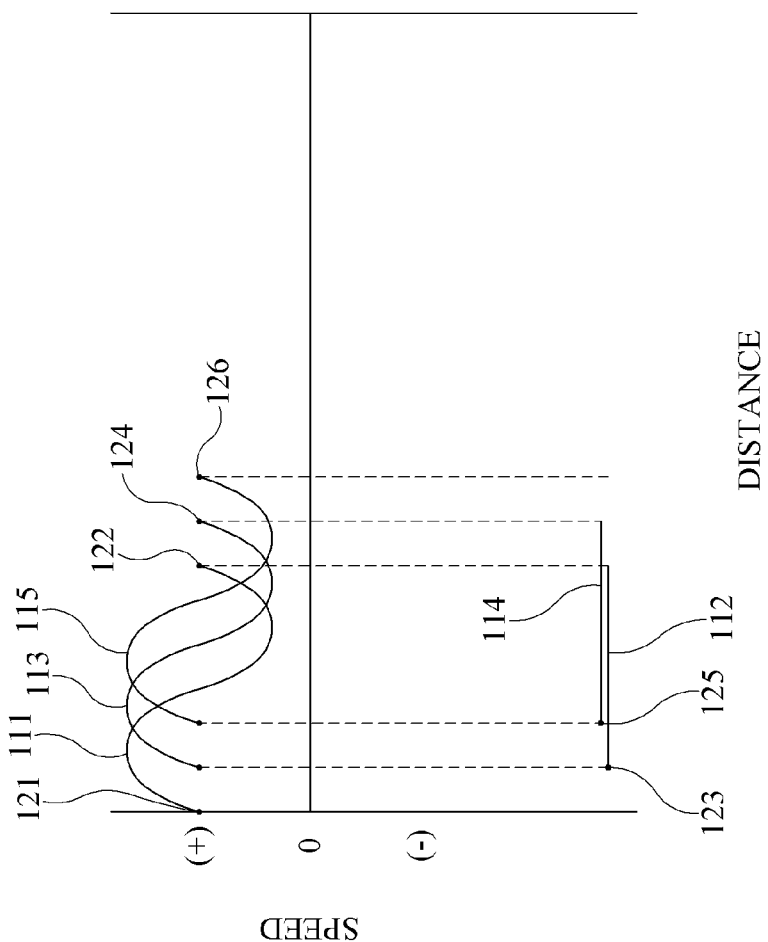
FIG. 4 is a graphical depiction of an embodiment of a method of forming a fiber curl layer in a fiberglass mat.

Referring now to FIG. 4, a first embodiment of a method of forming a fiber curl layer in a fiberglass mat is depicted in graphical form. The horizontal axis in the graph of FIG. 4 represents distance, with the left most location in the horizontal axis representing the positioning of the first traverse location 41. The right most horizontal location in the graph of FIG. 4 represents the second traverse location 42. The vertical axis in the graph of FIG. 4 represents velocity of the drum 30 in the direction of the traverse path 5. A positive velocity in FIG. 4 indicates the drum first end 31 is moving in a direction from the first traverse location 41 to the second traverse location 42 and a negative velocity in FIG. 4 indicates the drum first end 31 is moving in a direction from the second traverse location 42 to the first traverse location 41.

Still referring to FIG. 4, line 111 tracks the drum first end 31 as it moves at a sinusoidally variable speed from a location 121 adjacent the first traverse location 41 to a location 122, where it comes to a stop. Location 122 is more proximal the second traverse location 42 than location 121 is to the second traverse location 42. Line 112 tracks the drum first end 31 as it is then traversed in an opposite or reverse direction back toward first traverse location 41 at a substantially constant speed to location 123, where it comes to a stop. It is understood that in some embodiments the drum 30 may not come to an instantaneous stop and instantaneously reverse paths as depicted in the graph of FIG. 4, but instead may require a certain distance to come to a complete stop and a certain distance to reverse paths and ramp up to a desired speed. Location 123 is located between location 121 and location 122. In some embodiments the substantially constant speed movement may be greater than the maximum speed of the variable speed movement in the opposite direction. For example, in some embodiments, the substantially constant speed movement may be approximately four times greater than the maximum speed of the variable speed movement in the opposite direction. Also, for example, in some embodiments, the substantially constant speed movement may be approximately three times greater than the maximum speed of the variable speed movement in the opposite direction. Line 113 tracks the drum first end 31 as it moves at a sinusoidally variable speed from location 123 to a location 124, where it comes to a stop. Location 124 is more proximal the second traverse location 42 than location 123 is to the second traverse location 42. Line 114 tracks the drum first end 31 as it is then traversed in an opposite direction back toward first traverse location 41 at a substantially constant speed to location 125, where it comes to a stop. Location 125 is located between location 122 and location 123. Line 115 tracks the drum first end 31 as it moves at a sinusoidally variable speed from location 125 to location 126, where it comes to a stop.

Only a portion of a traverse from first traverse location 41 to second traverse location 42 is illustrated in FIG. 4. However, it is clear that the pattern depicted in FIG. 4 of moving the drum 30 in a first direction at a variable speed for less than the traverse length, then moving the drum 30 in an opposite direction at a substantially constant speed for less than the traverse length may be repeated until a full traverse of the drum 30 has been completed, such that the drum first end 31 has moved from the first traverse location 41 to the second traverse location 42. Moreover, a similar pattern may be followed as the drum 30 continues to traverse in an opposite direction, such that the drum first end 31 moves from the second traverse location 42 to the first traverse location 41. A plurality of traverses of the drum 30 back and forth, such that drum first end 31 moves back and forth between first traverse location 41 and the second traverse location 42 may be made while repeating the pattern to produce a fiber curl layer. In some embodiments the fiber curl layer created has an open characteristic, has slightly bundled fibers, and has an increased random curl to the fibers when the fiberglass mat is cut off the drum 30 and subsequently expanded. In some embodiments the slight bundling and added curl of the fibers may provide increased strength in the final filter product.

In some embodiments of manufacturing a fiberglass mat, a mat may be manufactured that combines the fiber curl layer described herein with other layers. For example, a skin layer as known in the art and described herein, may comprise a first layer of a mat and may be manufactured by traversing the drum 30 back and forth at a substantially constant speed, wherein drum first end 31 is moved back and forth between first traverse location 41 and second traverse location 42 at a substantially constant speed. A fiber curl layer as described herein may comprise a second layer of the mat and may be formed atop the skin layer. Also, for example, a first skin layer as known in the art and described herein, may comprise a first layer of a mat, a fiber curl layer may comprise a second layer of the mat and may be formed atop the first skin layer, and a second skin layer may comprise a third layer of a mat and be formed atop the fiber curl layer.

Also, for example, a skin layer as known in the art and described herein, may comprise a first layer of a mat, a loft or body layer as described herein may comprise a second layer of a mat and may be formed atop the skin layer, and a fiber curl layer may comprise a third layer of the mat and may be formed atop the body layer. The loft or body layer may comprise two or more distinct layers. For example, the drum 30 may be traversed back and forth at a first sinusoidally variable speed having a first amplitude a plurality of times, and then may be traversed back and forth at a second sinusoidally variable speed having a second amplitude a plurality of times. The mats described herein may be subsequently expanded and used in various industries such as, for example, the paint air filtration industry.

In accordance with embodiments of the method described herein, many variations may be made to the movement of the drum 30 to produce various products that have one or more fiber curl layers having different visual characteristics, different mechanical characteristics, and/or different filter characteristics. For example, in some embodiments when producing a fiber curl layer it is not necessary that certain movements of the drum 30 be at a substantially constant speed. For example, during a single traverse of the drum 30 along a traverse length, wherein drum 31 moves between first traverse location 41 and second traverse location 42, the drum 30 may be moved in a first direction at a first variable speed for less than the traverse length, then the drum 30 moved in an opposite direction at a second variable speed for less than the traverse length, and this general movement may be repeated until a single traverse of the drum 30 has been completed. The first variable speed and the second variable speed may vary with respect to one another in a number of ways such as, for example, average speed, maximum speed, minimum speed, amplitude, frequency, and/or waveform.

Also, for example, in some embodiments one or more variable speed movements may be non-sinusoidal. Also, for example, in some embodiments the centerline, amplitude, phase and/or frequency of the sinusoidal or other variable speed movement may be increased, decreased, and/or varied during one, multiple, or all traverses. Also, for example, the speed of the variable speed movement and/or of the substantially constant speed movement may be increased, decreased, and/or varied during one, multiple, or all traverses. The rotational speed of the drum 30 may also be increased, decreased, and/or varied during one, multiple, or all traverses. Decreasing the drum rotational speed, for example, while keeping other parameters constant may result in a fiber curl layer wherein the fibers are more coarse and the fiber curl layer is more open. Also, for example, cullet or fiberglass throughput through the furnace 20 may be increased, decreased, and/or varied during one, multiple, or all traverses. Also, for example, the amount of any resin applied to the fiberglass mat may be increased, decreased, and/or varied during one, multiple, or all traverses.

Figure 5:
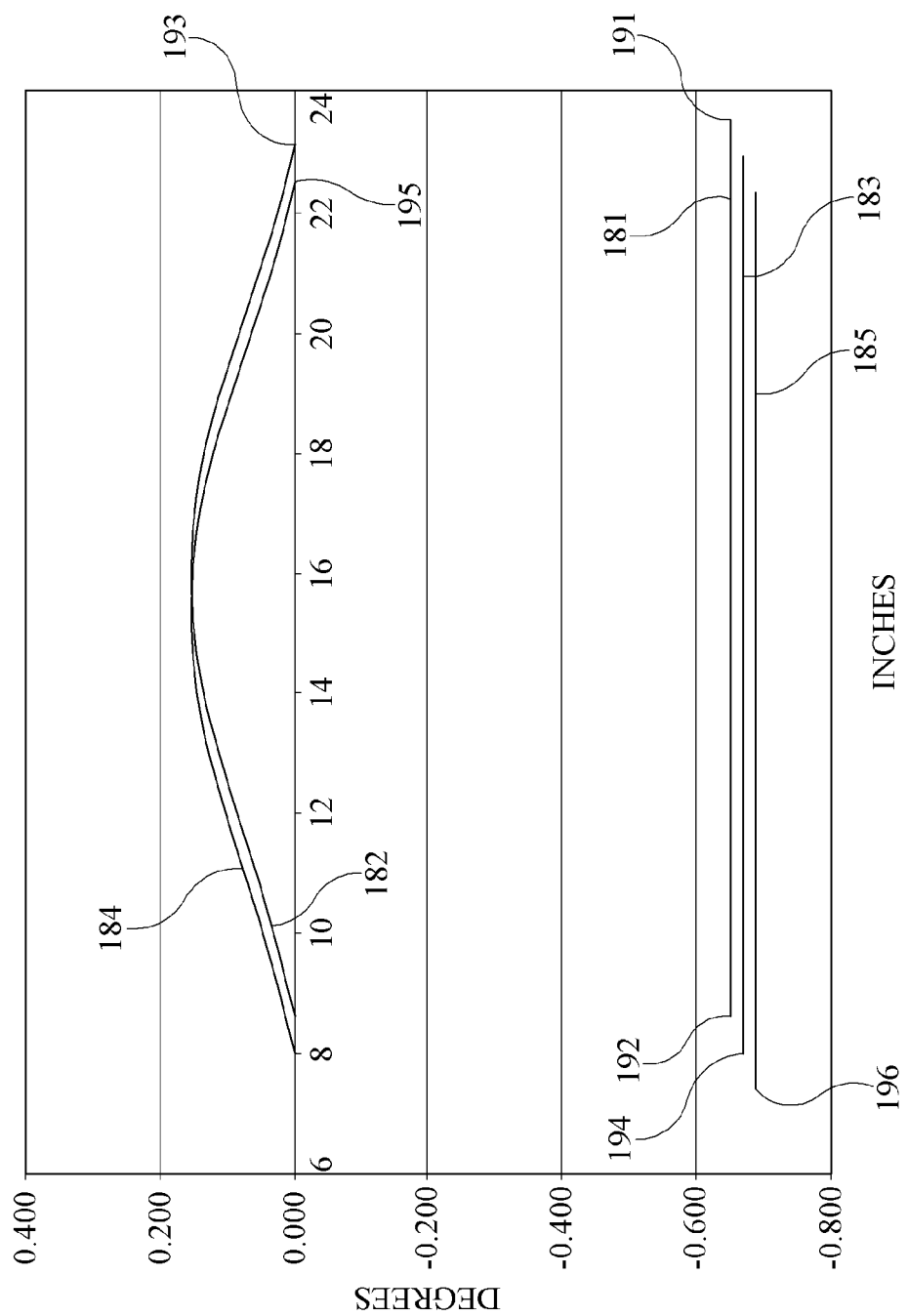
FIG. 5 is a graphical depiction of a second embodiment of a method of forming a fiber curl layer in a fiberglass mat.

Referring now to FIG. 5, a second embodiment of a method of forming a fiber curl layer in a fiberglass mat is depicted in graphical form. The horizontal axis in the graph of FIG. 5 represents distance in inches. The left most location of the horizontal axis represents a location where the drum first end 31 is approximately six inches away from the first traverse location 41. The right most location in the horizontal axis represents a location where the drum first end 31 is approximately twenty-four inches away from the first traverse location 41 and more proximal to the second traverse location 42.

The vertical axis in the graph of FIG. 5 represents the fiber angle, in degrees, of molten fiberglass strands 3 that are being deposited from the furnace 20 onto the drum 30. The fiber angle will be dependent on both the traversing speed of the drum 30 and the rotational speed of the drum 30. As a result, achieving a constant angle does not necessitate traversing of the drum 30 at a constant speed nor does achieving a variable angle necessitate traversing of the drum 30 at a variable speed. The positive fiber angles indicate the drum 30 is traversing in a direction wherein the drum first end 31 is moving from the first traverse location 41 to the second traverse location 42 and the negative fiber angles indicate the drum 30 is traversing in a direction wherein the drum first end 31 is moving from the second traverse location 42 to the first traverse location 41.

Still referring to FIG. 5, line 181 tracks the substantially constant fiber angle of fiber being deposited on the drum 30 as the drum first end 31 moves toward the first traverse location 41 from a location 191 to a location 192, where it comes to a stop. Location 192 is more proximal the first traverse location 41 than location 191 is to the first traverse location 41. Location 191 is a location where the drum first end 31 is approximately 23.53 inches from the first traverse location 41. Location 192 is a location where the drum first end 31 is approximately 8.61 inches from first traverse location 41. In some embodiments the distance between location 191 and location 192 may be approximately one-sixth of the traverse length.

Line 182 tracks the variable fiber angle of fiber being deposited on the drum 30 as the drum 30 is then traversed in an opposite or reverse direction wherein drum first end 31 moves back toward the second traverse location 42 at a variable speed to location 193, where it comes to a stop. Location 193 is located between location 191 and location 192. Location 193 is a location where the drum first end 31 is approximately 23.05 inches from the first traverse location 41. Line 183 tracks the substantially constant fiber angle of fiber being deposited on the drum 30 as the drum 30 moves from location 193 to a location 194, where it comes to a stop. In the embodiment depicted in FIG. 5, the fiber angle of line 183 is the same as the fiber angle of line 181, although line 183 is depicted offset slightly from line 181 for clarity. Location 194 is more proximal the first traverse location 41 than location 193 is to the first traverse location 41. In some embodiments the distance between location 194 and location 192 may be less than one percent of the traverse length. Location 194 is a location where drum first end 31 is approximately 8.02 inches from the first traverse location 41. Line 184 tracks the variable fiber angle of fiber being deposited on the drum 30 as the drum first end 31 moves toward the second traverse location 42 from location 194 to a location 195, where it comes to a stop.

Location 195 is a location where the drum first end 31 is approximately 22.47 inches from the first traverse location 41. Line 185 tracks the tracks the substantially constant fiber angle of fiber being deposited on the drum 30 as the drum first end 31 moves toward the first traverse location 41 from location 195 to location 196, where it comes to a stop. In the embodiment depicted in FIG. 5, the fiber angle of line 185 is the same as the fiber angle of line 181 and line 183, although line 185 is depicted offset slightly from line 181 and 183 for clarity. Location 196 is a location where the drum first end 31 is approximately 7.43 inches from the first traverse location 41. In some embodiments the distance between location 196 and location 194 may be less than one percent of the traverse length.

The drum 30 is traversing such that the drum first end 31 is moving from the second traverse location 42 toward the traverse location 41 in FIG. 5, whereas the drum 30 is traversing from the first traverse location 41 toward the second traverse location 42 in FIG. 4. Also, in FIG. 5 the movement of the drum is progressing across the traverse length when the constant fiber angle is being deposited, whereas in FIG. 4 the movement of the drum is progressing across the traverse length when the drum 30 is being moved at a variable speed and variable fiber angles are being deposited.

Referring now to FIGS. 6A-1, 6A-2 and FIG. 6B, tables are shown that correspond to FIG. 5 and provide a plurality of location and fiber angle values for lines 181, 182, 183, 184, and 185. Locations 191, 192, 193, 194, 195, and 196 are also provided in the tables of FIGS. 6A-1 and 6A-2 for ease in reference.

Only a portion of a traverse showing movement of drum first end 31 from second traverse location 42 to first traverse location 41 is illustrated in FIG. 5 and depicted in table form in FIG. 6. However, it is clear that the pattern depicted in FIGS. 5 and 6 may be repeated until a full traverse of the drum 30 has been completed. Also, it is clear that in some embodiments when the drum first end 31 reaches either the first traverse location 41 or the second traverse location 42, drum 30 may reverse traversing directions while either a variable or a substantially constant fiber angle continues to be laid. Moreover, in some embodiments the drum 30 may reverse directions multiple times as drum first end 31 is near a traverse location as it continues to progress through a predetermined pattern. For example, assume a substantially constant fiber angle is being laid on the drum 30 as the drum first end 31 approaches the first traverse location 41 moving in a first direction. The substantially constant fiber angle may continue to be laid as the drum first end 31 reaches the first traverse location 41 and moves in a second direction toward the second traverse location 42. The drum 30 may then come to a stop and move again in the first direction and a variable angle fiber may be laid on the drum 30 as the drum first end 31 approaches the first traverse location 41 moving in the first direction. The variable angle may continue to be laid as the drum first end 31 reaches the first traverse location 41 and moves in the second direction toward the second traverse location 42. This may occur a plurality of times while the drum first end 31 is proximal to the first traverse location 41 and/or the second traverse location 42.

Figure 7:
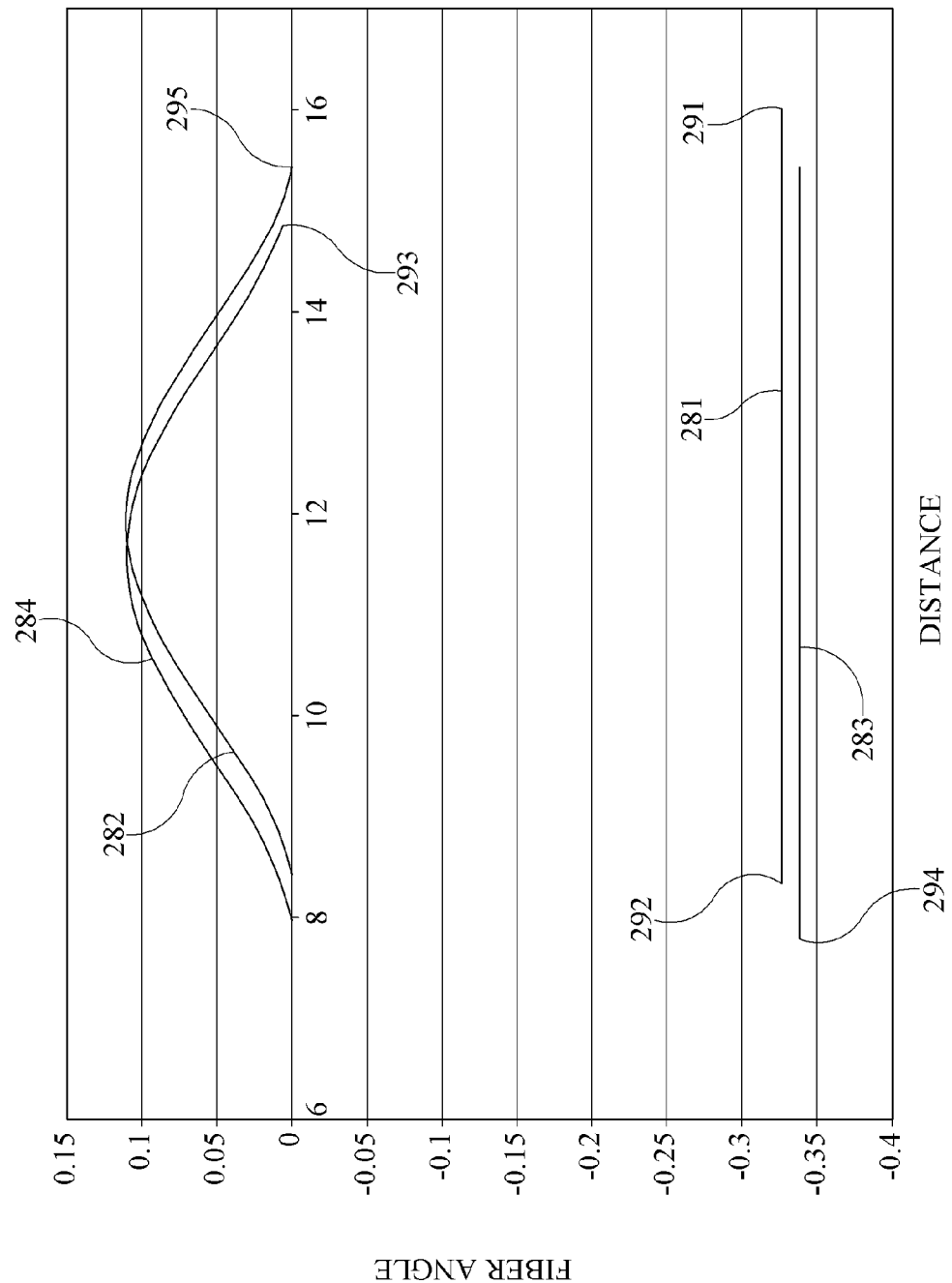
FIG. 7 is a graphical depiction of a third embodiment of a method of forming a fiber curl layer in a fiberglass mat.

Referring now to FIG. 7, a third embodiment of a method of forming a fiber curl layer in a fiberglass mat is depicted in graphical form. The horizontal axis in the graph of FIG. 7 represents distance in inches. The left most location of the horizontal axis represents a location where the drum first end 31 is approximately six inches away from the first traverse location 41. The right most location in the horizontal axis represents a location where the drum first end 31 is approximately seventeen inches away from the first traverse location 41 and more proximal to the second traverse location 42.

The vertical axis in the graph of FIG. 7 represents the fiber angle, in degrees, of molten fiberglass strands 3 that are being deposited from the furnace 20 onto the drum 30. The fiber angle will be dependent on both the traversing speed of the drum 30 and the rotational speed of the drum 30. The positive fiber angles indicate the drum 30 is traversing in a direction wherein the drum first end 31 is moving from the first traverse location 41 to the second traverse location 42 and the negative fiber angles indicate the drum 30 is traversing in a direction wherein the drum first end 31 is moving from the second traverse location 42 to the first traverse location 41.

Still referring to FIG. 7, line 281 tracks the substantially constant fiber angle of fiber being deposited on the drum 30 as the drum first end 31 moves toward the first traverse location 41 from a location 291 to a location 292, where it comes to a stop. Location 292 is more proximal the first traverse location 41 than location 291 is to the first traverse location 41. Location 291 is a location where the drum first end 31 is approximately 16.02 inches from the first traverse location 41. Location 292 is a location where the drum first end 31 is approximately 8.34 inches from first traverse location 41. In some embodiments the distance between location 291 and location 292 may be approximately one-eleventh of the traverse length.

Line 282 tracks the variable fiber angle of fiber being deposited on the drum 30 as the drum 30 is then traversed in an opposite or reverse direction wherein drum first end 31 moves back toward the second traverse location 42 at a variable speed to location 293, where it comes to a stop. Location 293 is located between location 291 and location 292. Location 293 is a location where the drum first end 31 is approximately 15.43 inches from the first traverse location 41. Line 283 tracks the substantially constant fiber angle of fiber being deposited on the drum 30 as the drum 30 moves from location 293 to a location 294, where it comes to a stop. In the embodiment depicted in FIG. 7, the fiber angle of line 283 is the same as the fiber angle of line 281, although line 283 is depicted offset slightly from line 281 for clarity. Location 294 is more proximal the first traverse location 41 than location 293 is to the first traverse location 41. In some embodiments the distance between location 294 and location 292 may be less than one percent of the traverse length. Location 294 is a location where drum first end 31 is approximately 7.8 inches from the first traverse location 41. Line 284 tracks the variable fiber angle of fiber being deposited on the drum 30 as the drum first end 31 moves toward the second traverse location 42 from location 294 to a location 295, where it comes to a stop. Location 295 is a location where the drum first end 31 is approximately 14.84 inches from the first traverse location 41.

The drum 30 is traversing such that the drum first end 31 is moving from the second traverse location 42 toward the traverse location 41 in FIG. 7 and the movement of the drum 30 is progressing across the traverse length when the constant fiber angle is being deposited. As described herein, in some embodiments when the drum first end 31 reaches either the first traverse location 41 or the second traverse location 42, drum 30 may reverse traversing directions while either a variable or a substantially constant fiber angle continues to be laid. Moreover, in some embodiments the drum 30 may reverse directions multiple times as drum first end 31 is near a traverse location as it continues to progress through a predetermined pattern. Also, as described herein, in some embodiments the movement of the drum 30 may alternatively or additionally progress across the traverse length when the variable fiber angle is being deposited.

In some embodiments whether the drum 30 progresses across the traverse length when the variable angle is being laid or when the constant angle is being laid may be dependent upon a controller's analysis of a sine wave having X axis values representative of time and having positive and negative Y axis values. The controller may be in electrical communication with the drum 30 and may cause the drum 30 to move in a certain speed and direction. The controller may cause a variable angle to be laid on the drum 30 when the sine wave has positive Y axis values and may cause a constant angle to be laid on the drum 30 when the sine wave has negative Y values. The sine wave may be shifted along the Y axis as desired to thereby alter the amount of constant and variable fiber angle being laid. Thus, the sine wave may be altered to thereby control whether the drum 30 progresses across the traverse length when the variable angle is being laid or when the constant angle is being laid.

Referring now to FIGS. 8A and 8B, a table is shown that corresponds to FIG. 7 and provides a plurality of location and fiber angle values for lines 281, 282, 283, and 284. Locations 291, 292, 293, 294, and 295 are also provided in the table of FIGS. 8A and 8B for ease in reference.

Only a portion of a traverse showing movement of drum first end 31 from second traverse location 42 to first traverse location 41 is illustrated in FIG. 7 and depicted in table form in FIGS. 8A and 8B. However, it is clear that the pattern depicted in FIGS. 7 and 8A and 8B may be repeated until a full traverse of the drum 30 has been completed. Also, it is clear that in some embodiments when the drum first end 31 reaches either the first traverse location 41 or the second traverse location 42, drum 30 may reverse traversing directions while either a variable or a substantially constant fiber angle continues to be laid. Moreover, in some embodiments the drum 30 may reverse directions multiple times as drum first end 31 is near a traverse location as it continues to progress through a predetermined pattern.

In some embodiments the method of forming a fiber curl layer in a fiberglass mat may be utilized to form a final fiberglass product having a rigid fiber curl layer on an unfiltered air entry side of the fiberglass mat, a fiberglass skin layer on a filtered air exit side of the final fiberglass product, and a fiberglass loft layer between the fiber curl layer and the fiber skin layer. In some embodiments the fiber curl layer may be manufactured in accordance with the third embodiment of FIGS. 7 and 8A and 8B.

The rigid fiber curl layer may be relatively open and have a number of fibers consistently bundled together to provide rigidity for structural support. The fiber bundles may be in a generally sinusoidal arrangement when the final fiberglass product is created, providing structural support and rigidity along with filtering capacity.

In some embodiments the skin layer may have a thickness of approximately one-quarter of an inch. The loft layer may comprise two or more distinct layers. For example, a first loft layer may be immediately adjacent the rigid fiber curl layer and be manufactured by traversing the drum 30 back and forth at a first sinusoidally variable speed having a first amplitude a plurality of times. A second loft layer may be immediately adjacent the skin layer and be manufactured by traversing the drum 30 back and forth at a second sinusoidally variable speed a plurality of times. The second sinusoidally variable speed may have an amplitude that is approximately one-half of the amplitude of the first sinusoidally variable speed. The first loft layer may be less dense than the second loft layer and more corrugated than the second loft layer. In some embodiments the skin layer and the first loft layer may have a plurality of fibers of a substantially common first average diameter and the second loft layer and the rigid fiber curl layer may have a plurality of fibers of a substantially common second average diameter. In some of those embodiments the first average diameter may be approximately 38 microns and in some of those embodiments the second average diameter may be approximately 28 microns.

Figure 9:
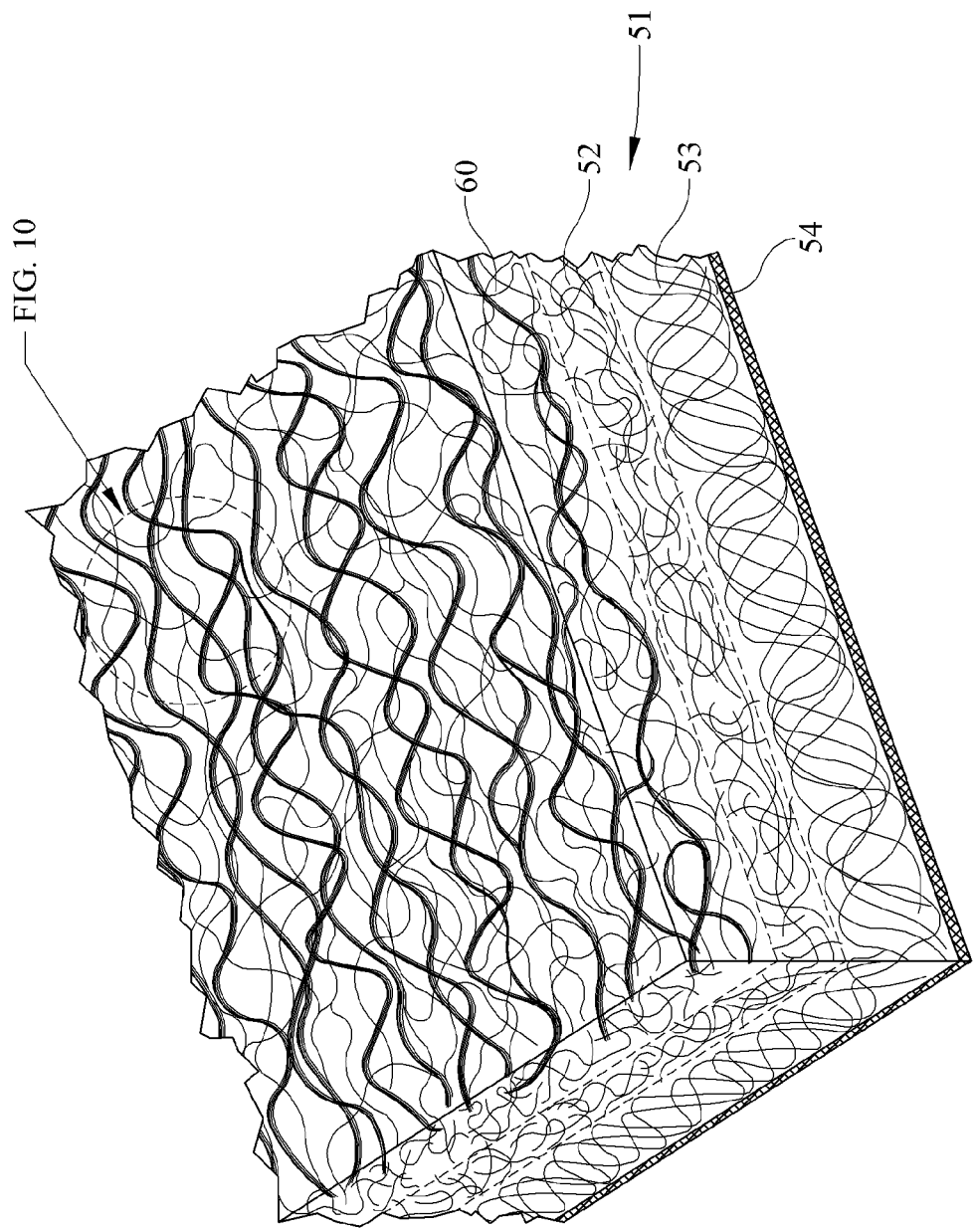
FIG. 9 is a top perspective view of an embodiment of a portion of a final fiberglass product of the present invention.
Figure 10:
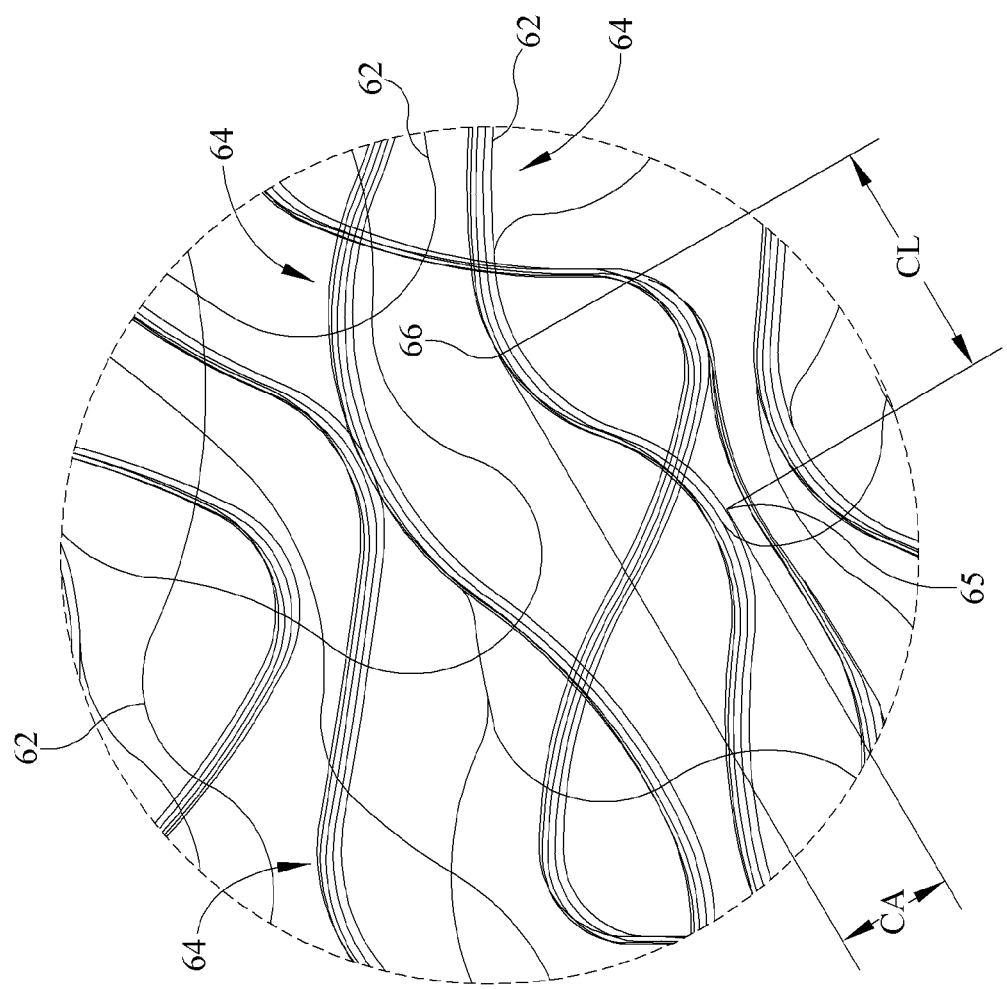
FIG. 10 is a close-up top view of the portion of a top fiber curl layer of the fiberglass mat of FIG. 9 indicated in FIG. 9.

Referring to FIGS. 9 and 10, a portion of an embodiment of a final fiberglass product 50 will be described in detail. The final fiberglass product 50 is ready for use by an end user and has been, for example, cut from a drum, subsequently expanded, cured, and cut to a predetermined desired size. For example, the fiberglass product 50 may be cut to a predetermined size and used in paint and/or varnish arresting applications. The fiberglass product 50 has a fiber curl layer 60 on an unfiltered air entry side of the final fiberglass product 50, a fiber skin layer 54 on a filtered air exit side of the final fiberglass product 50, and a fiber loft layer 51 between the fiber curl layer 60 and the fiber skin layer 54. The fiber loft layer 51 comprises a first fiber loft layer 52 adjacent the fiber curl layer 60 and a second fiber loft layer 53 adjacent the fiber skin layer 54.

The fiber curl layer 60 may in some embodiments be approximately seven grams per square foot (gsf) and/or may comprise approximately twenty to twenty five percent of the total weight of the final fiberglass product 50. In some embodiments the material make-up of the fiber curl layer 60 may be approximately 29% Urea-Formaldehyde resin and approximately 71% glass fiber with negligible dye. In some embodiments the fiber curl layer 60 may be approximately 1" thick and/or may comprise approximately 25% of the total thickness of the final fiberglass product 50.

Referring particularly to FIG. 10, which shows a close up of a portion of the fiber curl layer 60 depicted in FIG. 9, the fiber curl layer 60 comprises a plurality of individual fibers 62 that are disposed in a generally sinusoidal pattern. In some embodiments the individual fibers 62 within the fiber curl layer 60 may each have an average fiber diameter of approximately 38 microns. A single of the individual fibers 62 may form part of a plurality of distinct fiber bundles 64. Each of the individual fibers 62 may, at one or more locations, be bundled with one or more other individual fibers 62 to thereby form fiber bundles 64. Each of the fiber bundles 64 may comprise from two to two thousand individual fibers 62. Each of the fiber bundles 64 have a diameter that corresponds to a circle most closely conforming thereto. The diameter of the fiber bundles 64 may range from approximately 0.030 mm to 2.5 mm. In some embodiments, the final fiberglass product 50 may comprise a plurality of fiber bundles 64, wherein the fiber bundles 64 have an average of approximately three hundred and seventy individual fibers 62 and an average bundle diameter of approximately 0.87 mm. In some embodiments, the final fiberglass product 50 may comprise a plurality of fiber bundles 64, wherein the fiber bundles 64 have an average bundle diameter of approximately 0.87 mm, with a standard deviation of approximately 0.48 mm.

The individual fiber bundles 64 may have at least one curl length. Each curl length is the horizontal two dimensional linear distance between two immediately adjacent minimum and maximum points of an individual of fiber bundles 64. An exemplary curl length CL is indicated in FIG. 10 extending between two immediately adjacent minimum and maximum points 65 and 66 of an individual of fiber bundles 64. In some embodiments the final fiberglass product 50 may comprise a plurality of fiber bundles 64 each having one or more curl length, wherein the fiber bundles 64 have an average curl length of approximately 2.1 inches and a curl length range from approximately 1.5 inches to 4.2 inches. In some embodiments, the final fiberglass product 50 may comprise a plurality of fiber bundles 64, wherein the fiber bundles 64 have an average curl length of approximately 1.95 inches, with a standard deviation of approximately 0.34 inches.

The individual fiber bundles 64 may each have at least one curl amplitude. Each curl amplitude is the vertical linear distance between two immediately adjacent minimum and maximum points of an individual of fiber bundles 64. An exemplary curl amplitude CA is indicated in FIG. 10 extending between two immediately adjacent minimum and maximum points 65 and 66 of an individual of fiber bundles 64. In some embodiments the final fiberglass product 50 may comprise a plurality of fiber bundles 64 each having at least one curl amplitude, wherein the fiber bundles 64 have an average curl amplitude of approximately 1.1 inches and a curl amplitude range from approximately 0.65 inches to 1.7 inches. In some embodiments, the final fiberglass product 50 may comprise a plurality of fiber bundles 64, wherein the fiber bundles 64 have an average curl amplitude of approximately 1.12 inches, with a standard deviation of approximately 0.27 inches. In some embodiments the fiber curl layer 60 may be manufactured in accordance with, for example, the method of the third embodiment of FIGS. 7 and 8A and 8B.

The fiber skin layer 54 may be approximately nine gsf in some embodiments and approximately fourteen gsf in some embodiments and/or may comprise approximately thirty to forty five percent of the total weight of the final fiberglass product 50 in some embodiments. In some embodiments the material make-up of the fiber skin layer 54 may be approximately 29% Urea-Formaldehyde resin and approximately 71% glass fiber. In some embodiments the fiber skin layer 54 may be approximately one eighth of an inch thick and/or may comprise approximately 4% of the total thickness of the final fiberglass product 50. Each of the individual fiber strands in the fiber skin layer 54 may have an average fiber diameter of approximately 28 microns. There is minimal fiber bundling between the individual fiber strands in the fiber skin layer 54. The fiber skin layer 54 may be manufactured in accordance with the method described in the embodiment of FIG. 3A. In some embodiments the fiber skin layer 54 may be manufactured with a constant drum fiber angle of approximately 0.545 degrees.

The first fiber loft layer 52 may be approximately three and a half gsf in some embodiments and/or may comprise approximately ten to fifteen percent of the total weight of the final fiberglass product 50 in some embodiments. In some embodiments the material make-up of the first fiber loft layer 52 may be approximately 29% Urea-Formaldehyde resin and approximately 71% glass fiber. In some embodiments the first fiber loft layer 52 may be approximately 0.75 inches thick and/or may comprise approximately 20% of the total thickness of the final fiberglass product 50. In some embodiments each of the individual fiber strands in the first fiber loft layer 52 may have an average fiber diameter of approximately 38 microns. There is minimal fiber bundling between the individual fiber strands in the first fiber loft layer 52. The first fiber loft layer 52 may be manufactured in accordance with the method described in the embodiment of FIG. 3B. In some embodiments the first fiber loft layer 52 may be manufactured with a nominal on the drum fiber angle of approximately 0.321 degrees that varies by a multiple of 1.577 high to 0.423 low.

The second fiber loft layer 53 may be approximately eight gsf in some embodiments and/or may comprise approximately twenty to thirty percent of the total weight of the final fiberglass product 50 in some embodiments. In some embodiments the material make-up of the second fiber loft layer 53 may be approximately 29% Urea-Formaldehyde resin and approximately 71% glass fiber. In some embodiments the second fiber loft layer 53 may be approximately one and a quarter inches thick and/or may comprise approximately 30% of the total thickness of the final fiberglass product 50. In some embodiments each of the individual fiber strands in the second fiber loft layer 53 may have an average fiber diameter of approximately 28 microns. There is minimal fiber bundling between the individual fiber strands in the second fiber loft layer 53. The second fiber loft layer 53 may be manufactured in accordance with the method described in the embodiment of FIG. 3B. In some embodiments the second fiber loft layer 53 may be manufactured with a nominal on the drum fiber angle of approximately 0.349 degrees that varies by a multiple of 1.289 high to 0.712 low. The second fiber loft layer 53 may be created similar to the first loft layer 52, but with a nominal on the drum angle having approximately half the amplitude. This may allow in some embodiments for a more corrugated look and added structure for strength and holding of materials such as, for example, paint. In some embodiments, such as the embodiment depicted in FIG. 9, the corrugated look may comprise a plurality of fiber strands in the second fiber loft layer 53 having a second loft layer curl amplitude in the direction of the thickness of the second fiber loft layer 53. In some embodiments the second loft layer curl amplitude may be an average of approximately one inch with variations from half an inch to one and a half inches.

The foregoing description has been presented for purposes of illustration. It is not intended to be exhaustive or to limit the invention to the precise forms disclosed, and obviously many modifications and variations are possible in light of the above teaching. It is understood that while certain forms of the invention have been illustrated and described, it is not limited thereto except insofar as such limitations are included in the following claims and allowable functional equivalents thereof.

We claim:

1. A final fiberglass product having at least one fiber curl layer, the final fiberglass product comprising:
   a fiber curl layer on an unfiltered air entry side, said fiber curl layer having a plurality of fiber curl fibers;
   a fiber skin layer on an air exit side opposite said air entry side, said fiber skin layer having a plurality of fiber skin fibers;
   a fiber loft layer between said fiber curl layer and said skin layer, said fiber loft layer having a plurality of fiber loft fibers;
   said fiber curl layer having a plurality of generally sinusoidal fiber bundles;
   wherein said fiber bundles have an average of three hundred to four hundred and fifty said fiber curl fibers therein; and
   wherein said fiber bundles have an average fiber bundle diameter of between seven tenths of a millimeter and one millimeter with a fiber bundle diameter standard deviation of less than sixth tenths of a millimeter.

2. The final fiberglass product of claim 1, wherein said fiber bundle diameter standard deviation is less than five tenths of a millimeter.

3. The final fiberglass product of claim 1, wherein said fiber bundles have an average curl length of one and seven tenths inches to two and a half inches.

4. The final fiberglass product of claim 3, wherein said fiber bundles have an average curl amplitude of nine tenths of an inch to one and three tenths of an inch.

5. The final fiberglass product of claim 1, wherein said loft layer comprises a first loft layer and a second loft layer characteristically distinct from said first loft layer, said first loft layer having a plurality of first loft layer fibers of said fiber loft fibers and said second loft layer having a plurality of second loft layer fibers of said loft fibers.

6. The final fiberglass product of claim 5, wherein said first loft layer is immediately adjacent said fiber curl layer, said second loft layer is immediately adjacent said skin layer, and wherein said first loft layer is less dense than said second loft layer.

7. The final fiberglass product of claim 6, wherein said first loft layer is less corrugated than said second loft layer.

8. The final fiberglass product of claim 7, wherein said fiber curl fibers and said first loft layer fibers share a first substantially common average diameter.

9. The final fiberglass product of claim 8, wherein said skin fibers and said second loft layer fibers share a second substantially common average diameter distinct from said first substantially common average diameter.

10. A final fiberglass product having at least one fiber curl layer, the final fiberglass product comprising:
  a fiber curl layer on an unfiltered air entry side, said fiber curl layer having a plurality of fiber curl fibers;
  a fiber skin layer on an air exit side opposite said air entry side, said fiber skin layer having a plurality of fiber skin fibers;
  a fiber loft layer between said fiber curl layer and said skin layer, said fiber loft layer having a plurality of fiber loft fibers;
  said fiber curl layer having a plurality of generally sinusoidal fiber bundles providing rigidity along with filtering capacity, said fiber bundles having an average bundle diameter of between seventy-five hundredths of a millimeter and ninety-five hundredths of a millimeter;
    wherein the actual bundle diameter in at least sixty eight percent of said fiber bundles is within fifty-five hundredths of a millimeter of said average bundle diameter.

11. The final fiberglass product of claim 10, wherein said fiber bundles have an average curl length of one and seven tenths inches to two and a half inches.

12. The final fiberglass product of claim 10, wherein said fiber bundles have an average curl amplitude of nine tenths of an inch to one and three tenths of an inch.

13. The final fiberglass product of claim 10, wherein said fiber bundles have an average curl length of one and nine tenths inches to two and a three tenths inches.

14. The final fiberglass product of claim 13, wherein the actual number of said fiber curls in at least sixty eight percent of said fiber bundles is within fifty hundredths of a millimeter of said bundle average.

15. A final fiberglass product having at least one fiber curl layer, the final fiberglass product comprising:
  a fiber curl layer on an unfiltered air entry side, said fiber curl layer having a plurality of fiber curl fibers;
  a fiber skin layer on an air exit side opposite said air entry side, said fiber skin layer having a plurality of fiber skin fibers;
  a fiber loft layer between said fiber curl layer and said skin layer, said fiber loft layer having a plurality of fiber loft fibers;
  said fiber curl layer having a plurality of generally sinusoidal fiber bundles providing rigidity along with filtering capacity, said fiber bundles having a bundle average of three hundred to four hundred and fifty said fiber curl fibers therein;
  said fiber bundles having an average bundle diameter of between seventy-five hundredths of a millimeter and ninety-five hundredths of a millimeter;
    wherein the actual bundle diameter in at least sixty eight percent of said fiber bundles is within fifty-five hundredths of a millimeter of said average bundle diameter;
    wherein said fiber bundles have an average curl amplitude of nine tenths of an inch to one and three tenths of an inch; and
    wherein the actual curl amplitude in at least sixty eight percent of said fiber bundles is within four tenths of an inch of said average curl amplitude.

16. The final fiberglass product of claim 15, wherein said fiber bundles have an average curl length of one and seven tenths inches to two and a half inches.

17. The final fiberglass product of claim 16, wherein the actual curl length in at least sixty eight percent of said fiber bundles is within four tenths of an inch of said average curl length.

18. The final fiberglass product of claim 16, wherein said bundle average is from three hundred and thirty five to four hundred and fifteen.

19. The final fiberglass product of claim 18, wherein said actual bundle diameter in at least sixty eight percent of said fiber bundles is within fifty hundredths of a millimeter of said average bundle diameter.

* * * * *